(12) United States Patent
Chevrette

(10) Patent No.: US 8,506,764 B2
(45) Date of Patent: Aug. 13, 2013

(54) WATER CONDENSER

(76) Inventor: Claude Chevrette, Laval (CA)

(*) Notice: Subject to any disclaimer, the term of this patent is extended or adjusted under 35 U.S.C. 154(b) by 691 days.

(21) Appl. No.: 12/701,532

(22) Filed: Feb. 6, 2010

(65) Prior Publication Data

US 2011/0192711 A1 Aug. 11, 2011

(51) Int. Cl.
*B01D 5/00* (2006.01)
*B01D 3/02* (2006.01)

(52) U.S. Cl.
USPC ............ 202/185.3; 202/185.1; 159/34

(58) Field of Classification Search
USPC ............ 202/185.1, 185.3, 186, 187; 159/34; 122/7 R, 18.31; 261/117, 128, 152
See application file for complete search history.

(56) References Cited

U.S. PATENT DOCUMENTS

| | | | | |
|---|---|---|---|---|
| 5,846,296 A | * | 12/1998 | Krumsvik | 95/115 |
| 6,481,232 B2 | * | 11/2002 | Faqih | 62/291 |
| 7,942,387 B2 | * | 5/2011 | Forkosh | 261/26 |
| 2009/0200151 A1 | * | 8/2009 | Whisson | 202/185.1 |

FOREIGN PATENT DOCUMENTS

| | | |
|---|---|---|
| DE | 10353544 | 8/2005 |
| EP | 0947470 | 6/1999 |

OTHER PUBLICATIONS

Frayne, Colin (2002). Boiler Water Treatment—Principles and Practice, vols. I-II, Chemical Publishing Company Inc., 15-16.*

* cited by examiner

*Primary Examiner* — Nina Bhat

(57) ABSTRACT

A water condenser comprising a primary entry access, and an air entry access so as to bring air inside. A junction between a condensate reservoir passageway and a main passageway to control air flow. The condensate reservoir passageway leads to a condensate reservoir; the main passageway provides access to condensation chambers. A boiler located in the center of the water condenser below the first and second condensation chambers heats up humid air which rises as steam into the first and second condensation chambers where it condenses on the cold surfaces of the walls and ceiling.

4 Claims, 1 Drawing Sheet

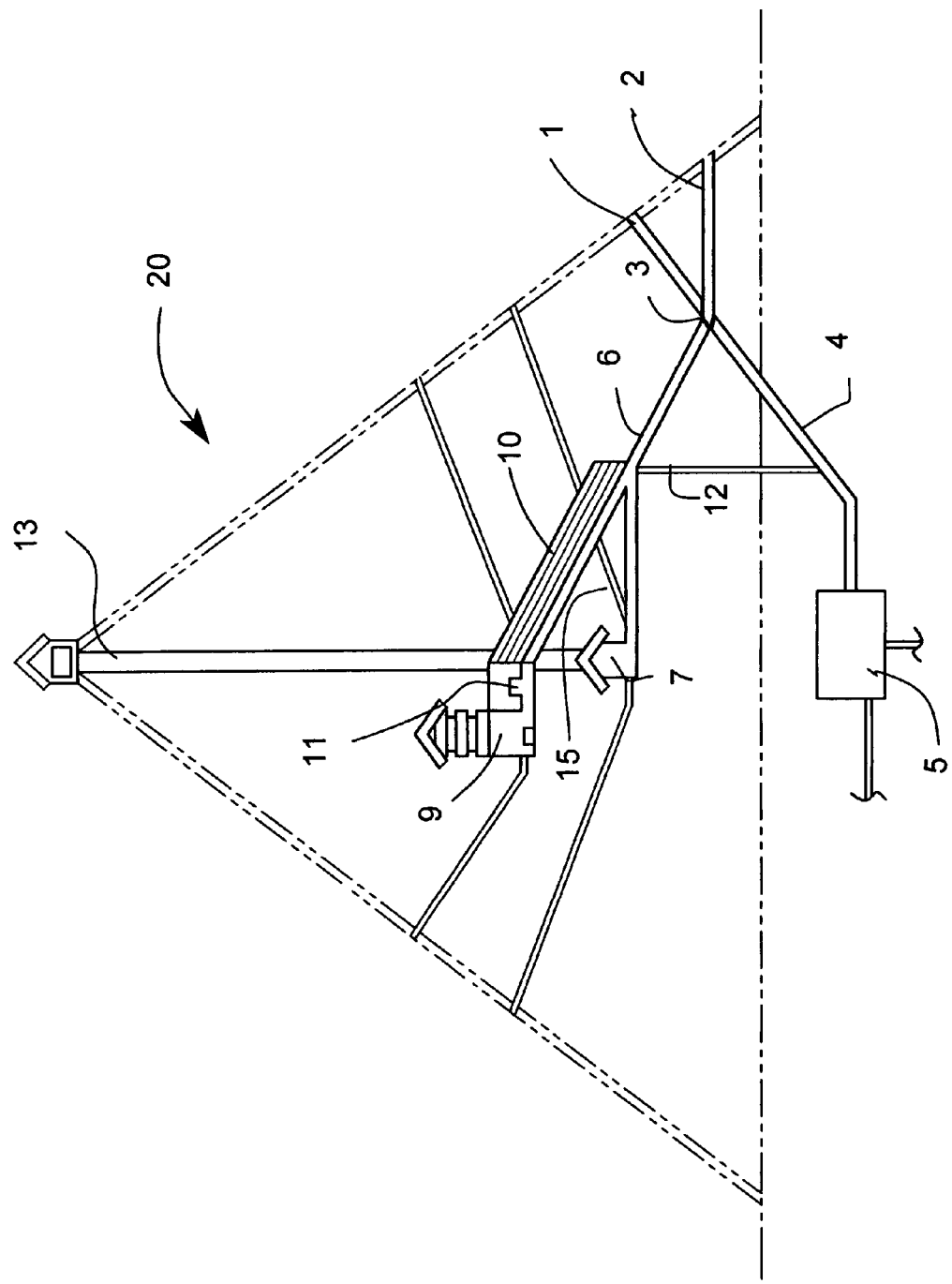

WATER CONDENSER

FIELD OF THE INVENTION

The present invention relates generally to water condenser but more particularly to the recuperation of air moisture for condensation and water storage.

BACKGROUND OF THE INVENTION

There are many methods that have been used over the years to collect water condensation and use it as a source of fresh water. The device go from the simplest water cone to more complex arrangements which create a surface onto which water vapor can condense and be collected.

SUMMARY OF THE INVENTION

It is a main purpose of this invention to provide for a large scale structure that can condense large quantities of water for use in desert zones.

To attain these ends, the present invention generally comprises a water condenser comprising a primary entry access, and an air entry access so as to bring air inside. A junction between a condensate reservoir passageway and a main passageway to control air flow. The condensate reservoir passageway leads to a condensate reservoir; the main passageway provides access to condensation chambers.

A boiler located in the center of the water condenser below the first and second condensation chambers heats up humid air which rises as steam into the first and second condensation chambers where it condenses on the cold surfaces of the walls and ceiling.

A chimney evacuates combustion by-products. The second condensation chamber is connected to the first condensation chamber and collects water from it. Water level in bottleneck isolates the first condensation chamber from the second condensation chamber by keeping some water level high and thus blocking air inside to keep moisture level high and thus favor more condensation. From the first condensation chamber, water is directed downward by way of the main passageway, the condensate reservoir passageway and a channel, until it reaches a cistern located underground.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 1 Cutaway view of the invention.

DETAILED DESCRIPTION OF THE PREFERRED EMBODIMENT

A water condenser (20) in the shape of a large pyramidal structure is built at a high altitude where the ambient temperature is generally cooler. The water condenser (20) has a primary entry access (1), and an air entry access (2) so as to bring air inside. Junction and gate (3) between a condensate reservoir passageway (4) and a main passageway (6) to control air flow. The condensate reservoir passageway (4) leads to a condensate reservoir (5). And the main passageway (6) provides access to condensation chambers (9, 10).

A boiler and heat diffuser (7) located in the center of the water condenser (20) below the first and second condensation chambers (9,10) heats up humid air which rises as steam into the first and second condensation chambers (9,10) where it condenses on the cold surfaces of the walls and ceiling (not shown). A chimney (13) evacuates combustion by-products, if heat is produced by way of combustion and a boiler air entry (15) provides air for combustion. There is a door (not shown) in the boiler (7) to isolate from the rest of the water condenser (20) so that water is not contaminated by the combustion gases.

The second condensation chamber (10) is connected to the first condensation chamber (9) and collects water from it. Water level in bottleneck (11) isolates the first condensation chamber (9) from the second condensation chamber (10) by keeping some water level high and thus blocking air inside to keep moisture level high and thus favor more condensation. From the second condensation chamber (10), water is directed downward by way of the main passageway (6), the condensate reservoir passageway (4) and a channel (12), until it reaches a cistern (5) located underground.

The first and second condensation chambers (9, 10) are lined with material such as ceramic or stainless steel which tend to remain cold and favor condensation.

The invention claimed is:

1. A water condenser comprising a primary entry access, and an air entry access so as to bring humid air into the condenser; a condensate reservoir passageway and a main passageway in operative connection with the air entry; a junction controller between a condensate reservoir passageway and a main passageway to control air flow; the condensate reservoir passageway connecting to a condensate reservoir; the main passageway connecting to a first and second condensation chamber including walls and ceiling; a boiler disposed within the condenser below said first and second condensation chamber to heat humid air generating steam which condenses on said walls and ceiling within said chambers; a chimney to evacuate combustion by-products from said boiler; the second condensation chamber connected to the first condensation chamber, the first condensation chamber further including a bottle neck isolating the first condensation chamber from the second condensation chamber by adjusting the water level and air, the condensed water being directed downwardly from the first condensation chamber by said main passageway to the condensate reservoir passageway which is in fluid connection with a cistern located underground.

2. The water condenser of claim 1, wherein junction control mechanism includes gate members.

3. The water condenser of claim 1, wherein said boiler includes a heat diffuser located below the first and second condensation chambers.

4. The water condenser of claim 1, wherein the first and second condensation chambers are lined with materials selected from the group consisting of ceramic and stainless steel.

\* \* \* \* \*